US012577910B1

(12) United States Patent
Yazici et al.

(10) Patent No.: US 12,577,910 B1
(45) Date of Patent: Mar. 17, 2026

(54) GAS TURBINE ENGINE WITH COMPARTMENT ANTI-ICING SYSTEM

(71) Applicant: RTX Corporation, Farmington, CT (US)

(72) Inventors: Murat Yazici, Glastonbury, CT (US); Thomas E. Clark, Wells, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/095,790

(22) Filed: Mar. 31, 2025

(51) Int. Cl.
| | |
|---|---|
| *F02C 7/047* | (2006.01) |
| *B64D 15/04* | (2006.01) |
| *B64D 15/12* | (2006.01) |
| *B64D 15/22* | (2006.01) |
| *F02C 9/18* | (2006.01) |

(52) U.S. Cl.
CPC .............. *F02C 7/047* (2013.01); *B64D 15/04* (2013.01); *B64D 15/12* (2013.01); *B64D 15/22* (2013.01); *F02C 9/18* (2013.01)

(58) Field of Classification Search
CPC ........ B64D 15/04; B64D 15/12; B64D 15/22; F02C 6/08; F02C 7/047; F02C 9/18
See application file for complete search history.

(56) References Cited

U.S. PATENT DOCUMENTS

| | | |
|---|---|---|
| 9,896,964 B2 | 2/2018 | Clarkson |
| 9,982,598 B2 | 5/2018 | Pritchard, Jr. |
| 10,837,313 B2 | 11/2020 | Clarkson |
| 2015/0040577 A1* | 2/2015 | Dischinger ............. F02C 7/047 |
| | | 60/39.093 |
| 2016/0097323 A1* | 4/2016 | Prather ................... F02C 7/047 |
| | | 415/178 |
| 2016/0169034 A1* | 6/2016 | Clarkson ................... F02C 7/05 |
| | | 415/177 |
| 2017/0284298 A1* | 10/2017 | Suciu ...................... F02K 3/065 |
| 2019/0023406 A1* | 1/2019 | Scothern .............. F01D 21/003 |

* cited by examiner

*Primary Examiner* — Scott J Walthour
(74) *Attorney, Agent, or Firm* — Getz Balich LLC

(57) ABSTRACT

A gas turbine engine is provided that includes a fan section, a compressor section, a combustion section, a turbine section, an annular fan bypass air path, a bleed air structure, an annular compartment, and an anti-icing system. The compressor section has a low and high pressure compressor sections. The fan bypass air path is defined by inner and outer bypass wall structures. An outer radial boundary structure defines an outer radial boundary of a core gas path within the low pressure compressor section. The bleed air structure is disposable in an open state or in a closed state. The annular compartment is defined by the inner bypass wall structure, the outer radial boundary structure, and a firewall. The anti-icing system is disposable in an activated state or in a deactivated state. In the activated state the anti-icing system is configured to mitigate ice accumulation within the annular compartment.

15 Claims, 5 Drawing Sheets

GAS TURBINE ENGINE WITH COMPARTMENT ANTI-ICING SYSTEM

BACKGROUND OF THE INVENTION

1. Technical Field

The present disclosure relates to gas turbine engines in general and to ice mitigation systems for gas turbine engines in particular.

2. Background Information

In gas turbine engines for use in powering aircraft, air is directed through multiple stage compressors. As the air passes through each successive compressor stage, the pressure of the air is increased. Under certain conditions, such as when the engine is operating at off design conditions, interstage bleed may be required to match the compressor stages. To mitigate these conditions, a gas turbine engine may include one or more bleed valves that are controlled to improve compressor performance by bleeding air or not bleeding air under particular engine circumstances.

In some instances, air bled off of the compressor is passed into an internal compartment and/or passages prior to exiting the engine. Gas turbine engines flying in a cold, wet environment may bleed "wet" air off of the compressor stage and that wet air may form as ice. The accumulated ice may interfere with performance of control structures (e.g., a control structure for opening and closing the compressor bleed valve.

SUMMARY

According to an aspect of the present disclosure, a gas turbine engine is provided that includes a fan section, a compressor section, a combustion section, a turbine section, an annular fan bypass air path, a bleed air structure, an annular compartment, and an anti-icing system. The compressor section has a low pressure compressor section and a high pressure compressor section. The annular fan bypass air path is defined by an outer bypass wall structure and an inner bypass wall structure. A core gas path extends through the compressor section, the combustion section, and the turbine section. An outer radial boundary structure defines an outer radial boundary of the core gas path within the low pressure compressor section. The bleed air structure is disposable in an open state or in a closed state. The annular compartment is defined by the inner bypass wall structure, the outer radial boundary structure, and a firewall. The firewall is disposed downstream of the bleed air structure. In the open state, the bleed air structure is configured to selectively pass a first air flow from the compressor section into the annular compartment. The anti-icing system is disposable in an activated state or in a deactivated state. In the activated state the anti-icing system is configured to mitigate ice accumulation within the annular compartment.

In any of the aspects or embodiments described above and herein, the bleed air structure may be engaged with the compressor section axially between the low pressure compressor section and the high pressure compressor section.

In any of the aspects or embodiments described above and herein, the engine may include an intermediate case that is disposed axially between the low pressure compressor section and the high pressure compressor section. The bleed air structure may be engaged with the compressor section axially between the low pressure compressor section and the intermediate case.

In any of the aspects or embodiments described above and herein, the firewall may extend radially between the inner bypass wall structure and the outer radial boundary structure.

In any of the aspects or embodiments described above and herein, the bleed air structure may include an actuating system for opening and closing the bleed air structure.

In any of the aspects or embodiments described above and herein, the first air flow from the compressor section that is passed into the annular compartment is at a first pressure and a first temperature. The anti-icing system may include an air distribution system configured to receive a second air flow and deliver the second air flow into the annular compartment, wherein the second air flow is at a second pressure and a second temperature. The second pressure may be greater than the first pressure, and the second temperature may be greater than the first temperature.

In any of the aspects or embodiments described above and herein, the second air flow may be bled from the high pressure compressor section.

In any of the aspects or embodiments described above and herein, the air distribution system may include an annular manifold configured to distribute the second air flow within the annular compartment.

In any of the aspects or embodiments described above and herein, the manifold may be disposed in the annular compartment and is attached to a forward side surface of the firewall.

In any of the aspects or embodiments described above and herein, the manifold may be disposed outside of the annular compartment, and may be attached to an aft side surface of the firewall.

In any of the aspects or embodiments described above and herein, the air distribution system may include a flow valve that is disposable in a closed state or in an open state.

In any of the aspects or embodiments described above and herein, the anti-icing system utilizes a temperature sensor and a controller, wherein the temperature sensor is configured to sense temperature within the annular compartment and produce a sensor signal representative of the sensed temperature, and wherein the controller is in communication with the flow valve, the temperature sensor, and a non-transitory memory storing instructions, which instructions when executed cause the system controller to dispose the flow valve in the closed state or in the open state based at least in part on the sensor signal.

In any of the aspects or embodiments described above and herein, the instructions that when executed cause the system controller to dispose the flow valve in the closed state or in the open state may be further based at least in part on a signal from an engine controller.

In any of the aspects or embodiments described above and herein, the anti-icing system may include a heating system that includes a plurality of heating elements that are disposed within the annular compartment and are configured to produce thermal energy.

In any of the aspects or embodiments described above and herein, the plurality of heating elements may be electrically powered.

In any of the aspects or embodiments described above and herein, the anti-icing system may utilize a temperature sensor and a controller. The temperature sensor may be configured to sense temperature within the annular compartment and produce a sensor signal representative of the sensed temperature. The controller may be in communication with the plurality of heating elements, the temperature sensor, and a non-transitory memory storing instructions. The instructions when executed may cause the system controller to control the plurality of heating elements based at least in part on the sensor signal.

In any of the aspects or embodiments described above and herein, the first air flow from the compressor section that is passed into the annular compartment is at a first pressure and a first temperature. The anti-icing system may include an air distribution system configured to receive a second air flow and deliver the second air flow into the annular compartment. The second air flow is at a second pressure and a second temperature. The second pressure may be greater than the first pressure, and the second temperature may be greater than the first temperature.

According to an aspect of the present disclosure, a retrofit anti-icing kit for use with a gas turbine engine is provided. The gas turbine engine includes a fan section, a compressor section, a combustion section, a turbine section, an annular fan bypass air path, a bleed air structure, and an annular compartment. The compressor section has a low pressure compressor section and a high pressure compressor section. The annular fan bypass air path is defined by an outer bypass wall structure and an inner bypass wall structure. The core gas path extends through the compressor section, the combustion section, and the turbine section. An outer radial boundary structure defines an outer radial boundary of the core gas path within the low pressure compressor section. The annular compartment is defined by the inner bypass wall structure, the outer radial boundary structure, and a firewall. The firewall is disposed downstream of the bleed air structure. The bleed air structure is configured to bleed a first air flow from the core gas path in the compressor section and pass the first air flow into the annular compartment. The first air flow is at a first pressure and a first pressure. The retrofit kit includes an anti-icing system that is disposable in an activated state or in a deactivated state. In the activated state, the anti-icing system is configured to mitigate ice accumulation within the annular compartment. The anti-icing system includes an air distribution system configured to receive a second air flow and deliver the second air flow into the annular compartment, wherein the second air flow is at a second pressure and a second temperature, and the second pressure is greater than the first pressure, and the second temperature is greater than the first temperature.

In any of the aspects or embodiments described above and herein, the anti-icing system may include a heating system that includes a plurality of electrically powered heating elements that are disposed within the annular compartment and are configured to produce thermal energy.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. The following description and drawings are intended to be exemplary in nature and non-limiting.

DETAILED DESCRIPTION

Figure 1:
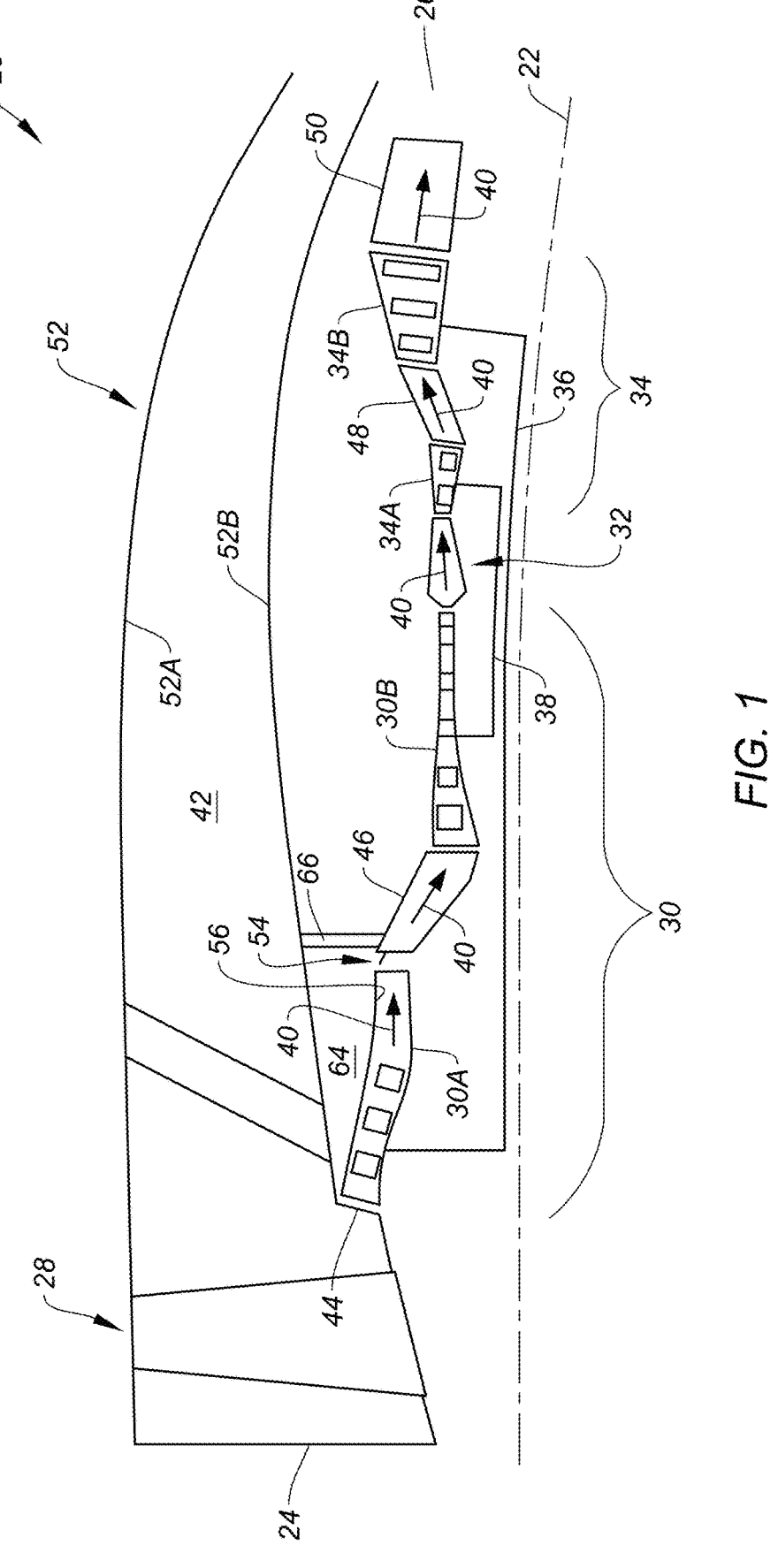
FIG. 1 is a diagrammatic sectional view of a gas turbine engine embodiment.

FIG. 1 shows a diagrammatic view of a gas turbine engine 20. The gas turbine engine 20 extends along an axial centerline 22 between an upstream airflow inlet 24 and a downstream exhaust 26. The gas turbine engine 20 includes a fan section 28, a compressor section 30, a combustion section 32, and a turbine section 34. The compressor section 30 includes a low-pressure compressor (LPC 30A) and a high-pressure compressor (HPC 30B). The turbine section 34 includes a high-pressure turbine (HPT 34A) and a low-pressure turbine (LPT 34B). The engine sections 30, 32, 34 are arranged sequentially along the centerline 22 within an engine housing. The LPC 30A is connected to and driven by the LPT 34B through a low-speed shaft 36. The HPC 30B is connected to and driven by the HPT 34A through a high-speed shaft 38. A geared architecture (e.g., a reduction gear box) may be included that enables the engine 20 to drive the fan section 28 at a different rotational speed than the compressor section 30 or the turbine section 34. The gas turbine engine 20 configuration diagrammatically shown in FIG. 1 may be referred to as a geared turbofan configuration.

Air entering the gas turbine engine 20 through the airflow inlet 24 (forward of the fan section 28) is bisected between a core gas path 40 and a fan bypass air path 42. A portion of the air entering the gas turbine engine 20 passes through the fan section 28 and enters the core gas path 40 via an annular compressor inlet 44. The core gas path 40 extends through the LPC 30A, an intermediate case 46, the HPC 30B, the combustion section 32, the HPT 34A, a mid-turbine frame 48, the LPT 34B, and the turbine exhaust case 50. Core gas exiting the LPT 34B exits the engine 20 via the exhaust 26. The remainder of the air entering the gas turbine engine 20 passes through the fan section 28 and enters the fan bypass air path 42 which is disposed radially outside of the core of the engine 20. The gas turbine engine 20 is diagrammatically shown in FIG. 1 engaged with a nacelle structure 52. The nacelle structure 52 is configured to provide an annular region radially outside of the core of the gas turbine engine 20. The annular region (which serves as the fan bypass air path 42) is defined by a structure (referred to as the "outer bypass wall structure 52A") that provides the bypass path outer flow surface and a structure (referred to as the "inner bypass wall structure 52B") that provides the bypass path inner flow surface.

The gas turbine engine 20 configuration diagrammatically shown in FIG. 1 is an example provided to facilitate the description herein. The present disclosure may be implemented in a variety of different gas turbine engine configurations and is not therefore limited to the gas turbine engine 20 configuration diagrammatically shown in FIG. 1.

The terms "forward" and "aft" are used herein to indicate the relative position of a component or surface. In a conventional axial engine such as that shown in FIG. 1, the fan section 28 is forward of the compressor section 30 and the turbine section 34 is aft of the compressor section 30. The terms "inner radial" and "outer radial" refer to relative radial positions from the engine centerline 22. An inner radial component is disposed radially closer to the engine centerline 22 than an outer radial component.

Figure 2:
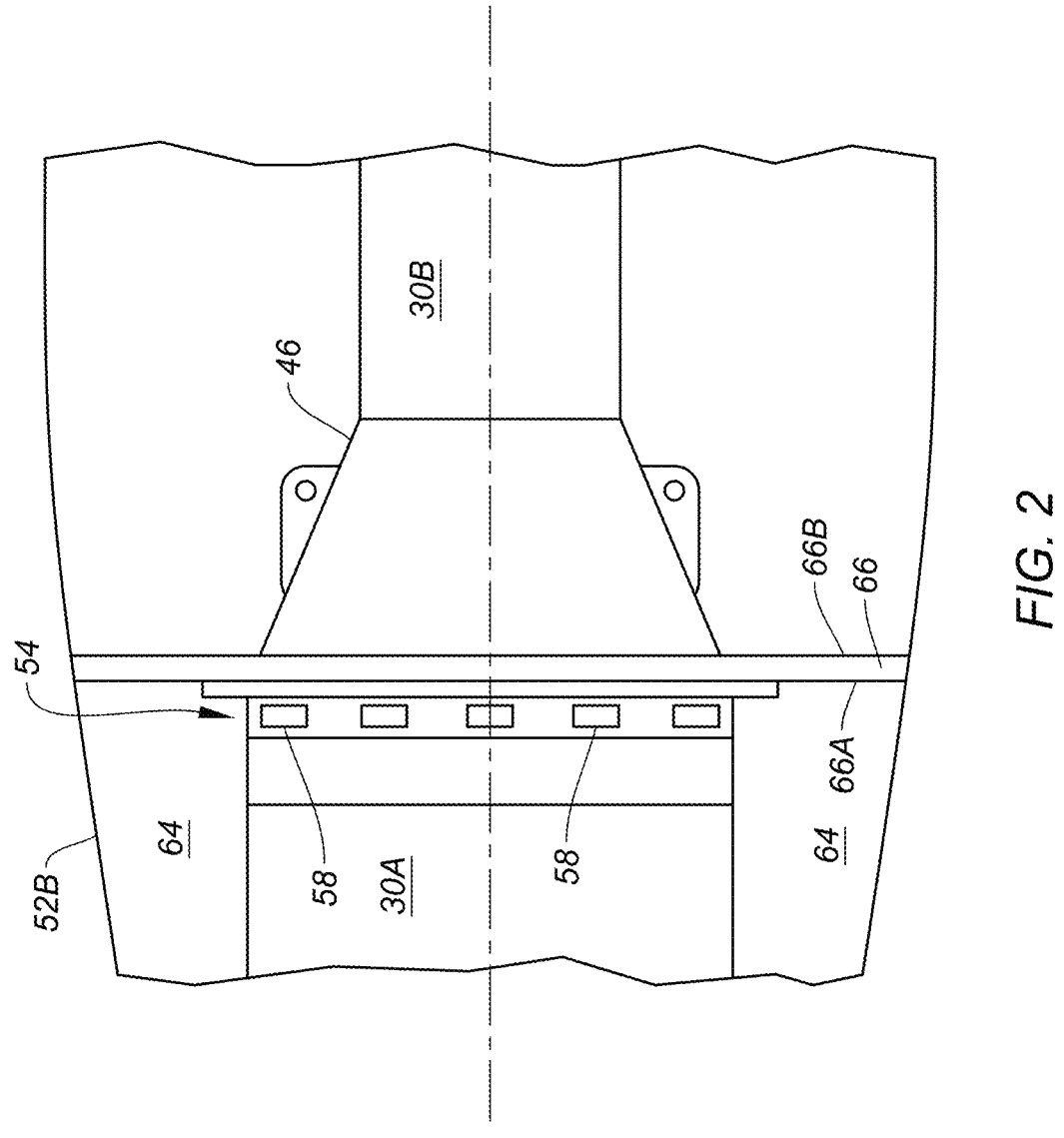
FIG. 2 is a diagrammatic partial view of a gas turbine engine, illustrating a portion of the compressor section.
Figures 5A, 5B:
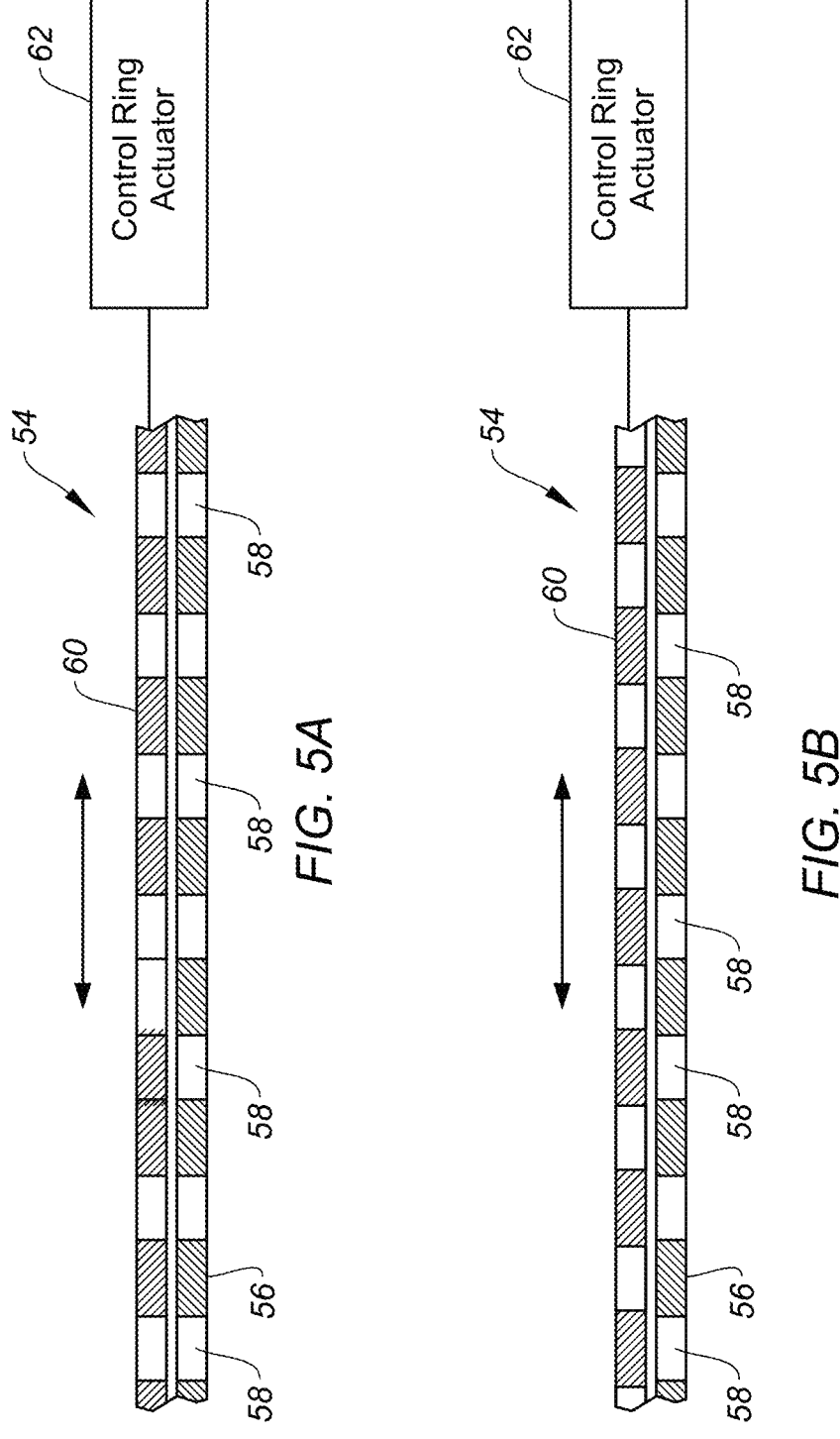
FIG. 5A is a diagrammatic representation of a bleed structure disposed in an open state.
FIG. 5B is a diagrammatic representation of a bleed structure disposed in a closed state.

The gas turbine engine 20 configuration diagrammatically shown in FIG. 1 includes a compressor air bleed structure 54 (referred to hereinafter as the "bleed structure 54") disposed in an outer radial boundary structure 56 of the core gas path 40. FIG. 2 diagrammatically illustrates a bleed structure 54 disposed at the intersection of the aft end of the LPC 30A and the intermediate case 46. The bleed structure 54 is a controllable structure that may be disposed in a closed state or in an open state. In some embodiments, the bleed structure 54 may be controllable to be disposed in a plurality of open states; e.g., partially open states like 25% open, 50% open, 75% open, and the like, and a fully open configuration. In the closed state, the bleed structure 54 is controlled to prevent compressed air from exiting the compressor section 30 through the bleed structure 54. The bleed structure 54 may include a plurality of ports 58 that are circumferentially distributed and may include an actuating system (e.g., control rings, hydraulic actuators, EMA, and the like) operable to selectively open or close the bleed structure 54. FIG. 5A diagrammatically illustrates a bleed structure 54 having ports 58 disposed in the outer radial boundary structure 56, a control ring 60, and an actuator 62. The control ring 60 is an annular member that can be rotated between a first position wherein the bleed structure 54 is in an open state (e.g., see FIG. 5A) and a second position wherein the bleed structure 54 is in a closed state; e.g., see FIG. 5B. The bleed structure diagrammatically shown in FIGS. 5 and 5A is provided for illustration purposes. The present disclosure is not limited to any particular bleed structure 54 configuration.

Referring to FIGS. 1 and 2, compressed air bled off of the core gas path 40 through the compressor bleed structure 54 passes into an internal annular compartment that may be referred to as the "fan aft ID compartment 64". The fan aft ID compartment 64 is defined by the outer radial boundary structure 56 of the core gas path 40, the inner bypass wall structure 52B, and a firewall 66 that extends radially between the intermediate case 46 and the inner bypass wall structure 52B. The firewall 66 may be described as having a forward side surface 66A and an aft side surface 66B; see FIG. 2. In some instances, components (e.g., electronic, electromechanical, or mechanical components, or any combination thereof) may be disposed or exposed within the fan aft ID compartment 64.

When a gas turbine powered aircraft flies in an environment with cold, wet air, the air drawn into the compressor section 30 and bled through the bleed structure 54 can result in ice accumulation within the fan aft ID compartment 64. The ice accumulation may be problematic for a variety of reasons. For example, ice accumulation in the fan aft ID compartment 64 can negatively impact the operation of components (e.g., electronic, electromechanical, or mechanical components that may or may not be a component within the bleed structure 54) that are disposed in or exposed within the fan aft ID compartment 64. In the absence of the present disclosure, the bleed structure may be stacked open as a result of ice accumulation. Ice shedding can create an interruption in operation. Substantial ice accumulation can negatively affect air flow with fan aft ID compartment 64 and can create unwanted excess weight.

Figure 3:
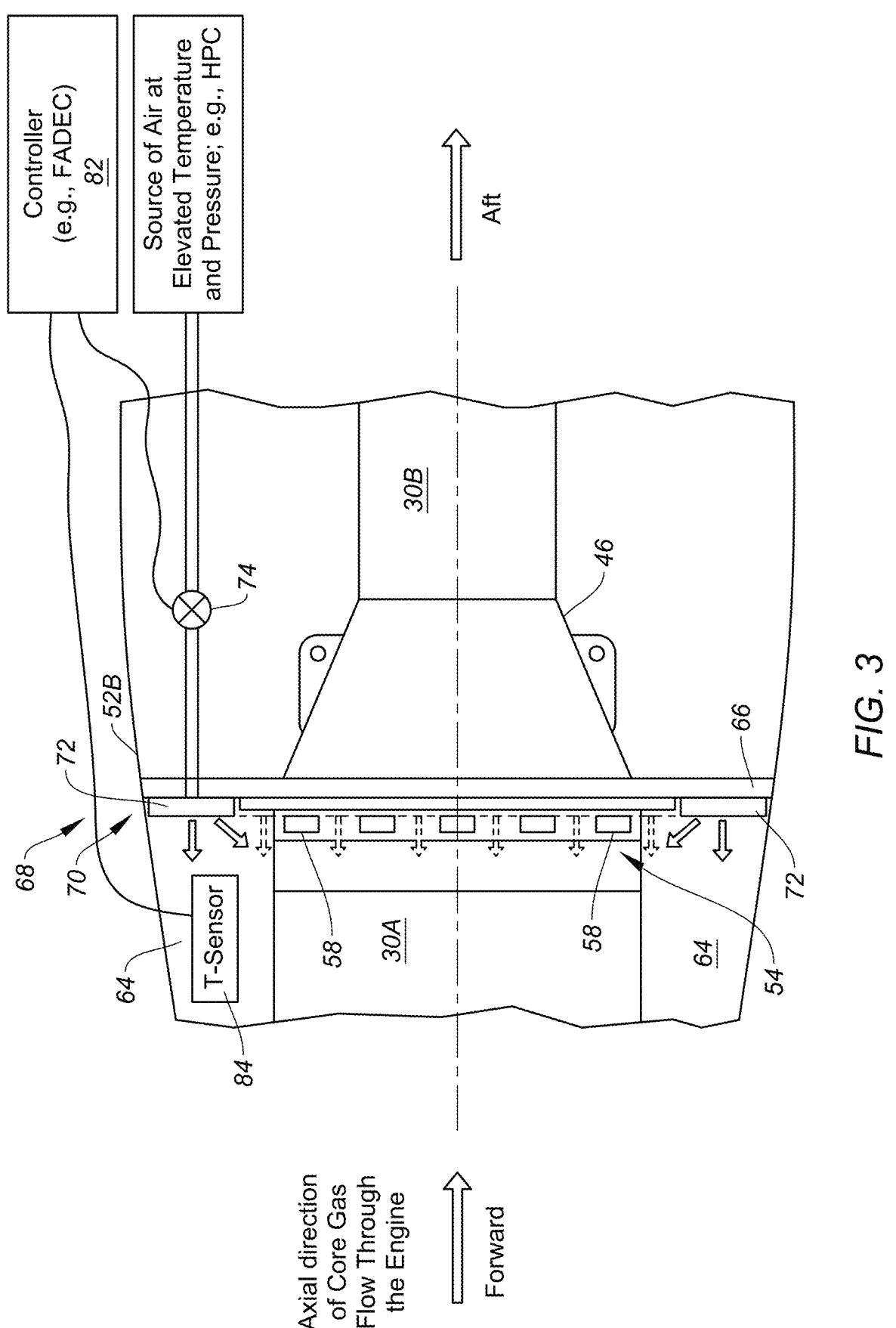
FIG. 3 is a diagrammatic partial view of a gas turbine engine, illustrating a portion of the compressor section and an embodiment of the present disclosure.

Referring to FIG. 3, aspects of the present disclosure include an anti-icing system 68 that may be utilized to mitigate or prevent ice accumulation within the fan aft ID compartment 64. The anti-icing system 68 may be disposable in an activated state or in a deactivated state. In some embodiments, the present disclosure anti-icing system 68 includes an air distribution system 70 that is in communication with a source of air at an elevated temperature and pressure; e.g., air at a temperature and pressure adequate to mitigate or prevent ice accumulation-such air referred to hereinafter as "elevated air". The HPC 30B is a non-limiting example of such a source of air. When the anti-icing system 68 is in the activated state, the air distribution system 70 is configured to provide elevated air to the fan aft ID compartment 64 and may also be configured to distribute the elevated air within the fan aft ID compartment 64. The specific manner in which the elevated air is distributed within the fan aft ID compartment 64 may vary depending on the application. For example, in those gas turbine engine applications wherein the bleed structure 54 includes an actuating system for opening and closing the bleed structure 54, the air distribution system 70 may be configured to supply the elevated air into the fan aft ID compartment 64 in close proximity to the bleed structure actuating system components to prevent and/or remove ice accumulation from the actuating system. As another example, the air distribution system 70 may be configured to supply the elevated air into the fan aft ID compartment 64 in close proximity to electrical components that are disposed within or exposed to the fan aft ID compartment 64. These are non-limiting examples of how the present disclosure air distribution system 70 may be configured.

FIG. 3 diagrammatically illustrates an embodiment of the air distribution system 70 that includes an annular manifold 72 disposed on a forward side of the firewall 66; e.g., attached to the firewall forward side surface 66A. The manifold 72 is in fluid communication with the source of elevated air; e.g., air bled off of the HPC 30B. The air distribution system 70 includes a flow valve 74 that may be controlled to be disposed in a closed state, in an open state, or in partially open states. In the closed state, no elevated air is allow to pass through the valve 74 and into the manifold 72 and the anti-icing system 68 is disposed in a disengaged state. In the open state, elevated air is allowed to pass through the valve 74 and into the manifold 72 and the anti-icing system 68 is disposed in an engaged state. The manifold 72 may be in fluid communication with a plurality of nozzles (or other flow devices—not shown) that are configured to control a flow of elevated air relative to a component disposed within the fan aft ID compartment 64 (e.g., elevated air impinging on the component, and the like) to maintain that component ice-free and/or to remove any accumulated ice. In some embodiments, an annular manifold 72 may be disposed on the aft side of the firewall 66 (e.g., attached to the firewall aft side surface 66B) and in fluid communication with flow structures (e.g., nozzles or the like) that extend through the firewall 66 to supply the elevated air into the fan aft ID compartment 64 where desired.

Figure 4:
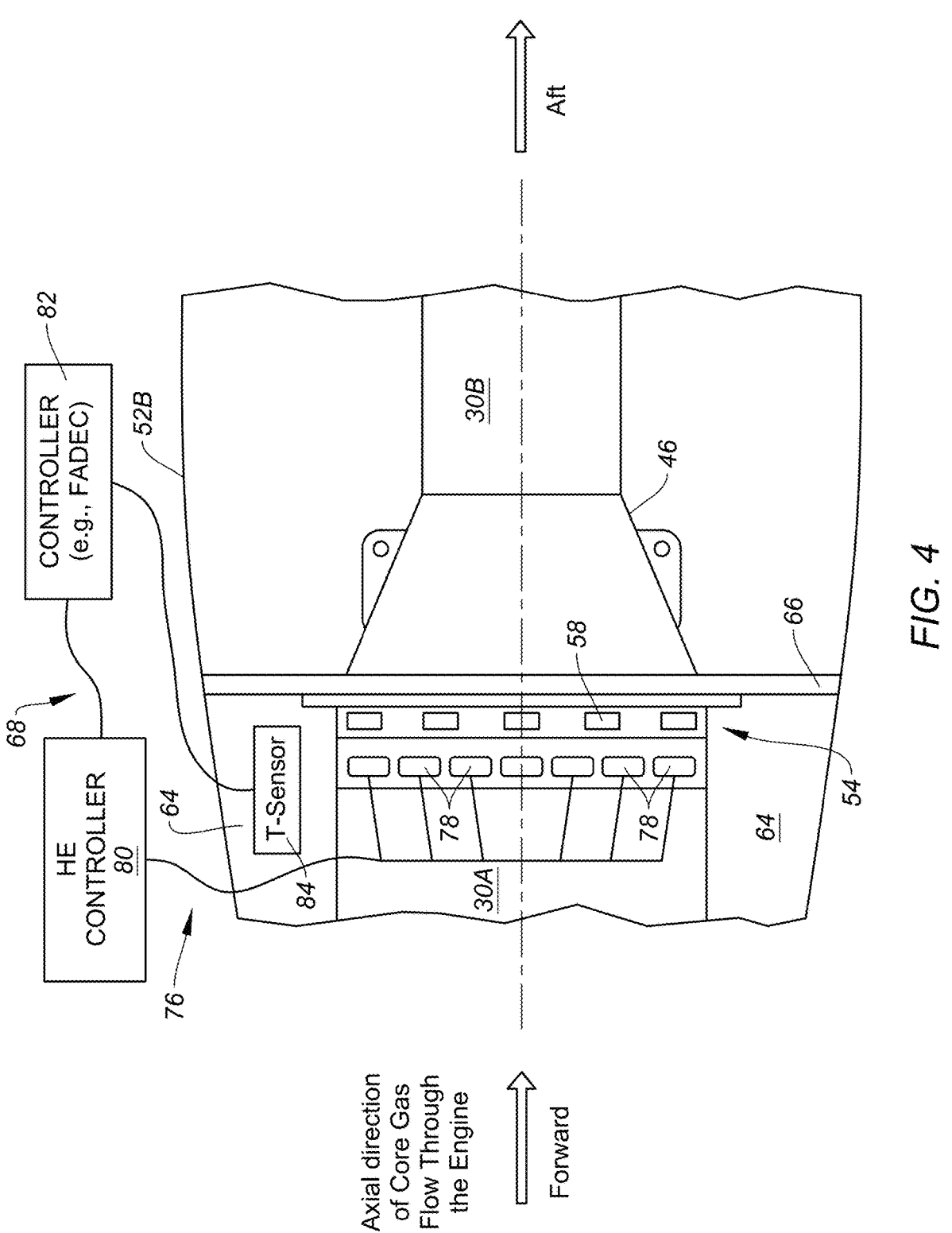
FIG. 4 is a diagrammatic partial view of a gas turbine engine, illustrating a portion of the compressor section and an embodiment of the present disclosure.

As illustrated in FIG. 4, the present disclosure anti-icing system 68 may include a heating system 76 that is in communication with one or more components disposed in or exposed to the fan aft ID compartment 64. The heating system 76 includes a plurality of electrically powered heating elements 78 that are controlled to provide thermal energy when desired to maintain a component in an ice-free state and/or to remove any accumulated ice. FIG. 4 diagrammatically illustrates an embodiment that includes a plurality of heating elements 78 mounted on a surface in close proximity to the bleed structure 54. An example of a type of heating element 78 that may be used in this application is a resistive heater or a nano-resistor heater, or the like. Other examples of heating element 78 types that may be used include microwave guide heaters, or power electronics that generate waste heat. The present disclosure is not limited to using any particular type of heating element 78. In some embodiments, the present disclosure anti-icing system 68 may utilize more than one type of heating element 78; e.g., a first type of heating element 78 for a first component in the fan aft ID compartment 64, a second type of heating element 78 for a second component in the fan aft ID compartment 64, and so on. FIG. 4 diagrammatically illustrates the plurality of heating elements 78 in electrical communication with a heating element controller ("HE controller 80") and the HE controller 80 in communication with another controller 82. The HE controller 80 may be dedicated to controlling the heating elements 78. The other controller 82 may be configured to communicate with system sensors or other components necessary for the operation of the heating elements 78 and with the HE controller 80.

FIGS. 3 and 4 also diagrammatically illustrate that the anti-icing system 68 may include or be in communication with sensors; e.g., temperature sensors 84. For example, the system 68 may include one or more sensors 84 that sense the air temperature, or component temperature, or the like within the fan aft ID compartment 64.

As described above, in some embodiments the present disclosure system may include a controller 82 or be implemented using a controller (e.g., an "engine controller") dedicated to perform other functionality as well as the functionality described herein. Non-limiting examples of an "engine controller" include the electronic engine control (EEC), the full authority digital engine control (FADEC), and the like that perform other functionality in addition. Regardless of whether a dedicated controller or a "shared controller" is utilized, the controller 82 is in communication with other system components such as an elevated air valve (e.g., flow valve 74), or the electrically powered heating elements 78, or sensors, and the like; e.g., to control the operation of the respective component and/or to receive signals from and/or transmit signals to that system component to perform the functions described herein. The controller 82 may include one or more of any type of computing device, computational circuit, processor(s), CPU, computer, or the like (collectively referred to as a "control device") capable of executing a series of instructions that are stored in memory. In those embodiments wherein the controller 82 includes more than one control device, the control devices may be in communication with one another and may be disposed in any architecture that is capable of achieving the functionality described herein. The instructions may include an operating system, and/or executable software modules such as program files, system data, buffers, drivers, utilities, and the like. The executable instructions may apply to any functionality described herein to enable the inspection system to accomplish the same algorithmically and/or coordination of system components. The controller 82 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. Communications between the controller 82 and other system components may be via a hardwire connection or via a wireless connection.

Embodiments of the present disclosure anti-icing system 68 may be controlled between an on-state and an off-state based on the input from sensors dedicated to the anti-icing system 68, or based on data input from other aircraft systems (e.g., environmental data available from the FADEC, or the like), or based on stored empirical data, and/or the status of the bleed structure 54, or the like, or any combination thereof. Once the anti-icing system 68 determines that ice is accumulating or may accumulate, the controller 82 (via stored instructions) may execute instructions that cause the anti-icing system 68 to operate. In the case of a present disclosure anti-icing system 68 that includes an air distribution system 70 operable to provide elevated air to predetermined locations within the fan aft ID compartment 64, the controller 82 may provide instructions to open the flow valve 74 that allows elevated air into the air distribution system 70. Those same instructions may cause the flow valve 74 to be disposed in a fully open state or in a partially open state, and to maintain the flow of elevated air until the controller 82 deems (based on input data) that the anti-icing system 68 is no longer required. In the case of a present disclosure anti-icing system 68 that includes a heating system 76 with a plurality of electrically powered heating elements 78, the controller 82 may provide instructions to the HE controller 80 to operate certain of, or all of, the heating elements 78, instructions to operate the heating elements 78 to produce a given thermal output (e.g., 100% available thermal output, 75% available thermal output, etc.), when to end operation of the heating elements 78, and the like.

To be clear, the present disclosure anti-icing system 68 may be configured with only the air distribution system 70, or with only the plurality of electrically powered heating elements 78, or in a configuration that includes both the air distribution system 70 and the plurality of electrically powered heating elements 78. Utilizing the air distribution system 70 and the electrically powered heating elements 78 in combination or in a complementary manner to mitigate or prevent ice accumulation within the fan aft ID compartment 64 is understood to provide appreciable benefits. For example, depending on the flight segment of the aircraft, it may not be desirable to bleed air off of the HPC 30B for use in the air distribution system 70. In such a scenario under the present disclosure, de-icing may be accomplished using the plurality of electrically powered heating elements 78 alone. In contrast, in some flight segments of the aircraft, the electrical energy used to power the electrically powered heating elements 78 may be "expensive" from an operational point of view. In such a scenario, de-icing may be accomplished using the air distribution system 70 alone.

Embodiments of the present disclosure may be included with a gas turbine engine 20 as original equipment. Other embodiments of the present disclosure may be configured as a retrofit kit that can be applied to an existing gas turbine engine 20 as a retrofit.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, cither individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A gas turbine engine, comprising:
   a fan section;
   a compressor section having a low pressure compressor section and a high pressure compressor section;
   a combustion section;
   a turbine section;
   an annular fan bypass air path defined by an outer bypass wall structure and an inner bypass wall structure;
   wherein a core gas path extends through the compressor section, the combustion section, and the turbine section, and wherein an outer radial boundary structure defines an outer radial boundary of the core gas path within the low pressure compressor section;
   a bleed air structure that is disposable in an open state or in a closed state, the bleed air structure being downstream from the low pressure compressor section;
   an annular compartment defined by the inner bypass wall structure, the outer radial boundary structure, and a firewall, wherein the firewall is disposed downstream of the bleed air structure;
   wherein in the open state, the bleed air structure is configured to selectively pass a first air flow from the compressor section into the annular compartment; and
   an anti-icing system disposable in an activated state or in a deactivated state, wherein in the activated state the anti-icing system is configured to mitigate ice accumulation within the annular compartment;
   wherein the first air flow from the compressor section that is passed into the annular compartment is at a first pressure and a first temperature;
   wherein the anti-icing system includes an air distribution system configured to receive a second air flow and deliver the second air flow into the annular compartment, wherein the second air flow is at a second pressure and a second temperature;
   wherein the second pressure is greater than the first pressure, and the second temperature is greater than the first temperature; and
   wherein the air distribution system includes an annular manifold configured to distribute the second air flow within the annular compartment, the annular manifold being attached to the firewall such that an outlet of the manifold, from which the second air flow exits to the annular compartment, is downstream from the low pressure compressor section.

2. The gas turbine engine of claim 1, wherein the bleed air structure is engaged with the compressor section axially between the low pressure compressor section and the high pressure compressor section.

3. The gas turbine engine of claim 2, further comprising an intermediate case disposed axially between the low pressure compressor section and the high pressure compressor section; and
   wherein the bleed air structure is engaged with the compressor section axially between the low pressure compressor section and the intermediate case.

4. The gas turbine engine of claim 1, wherein the firewall extends radially between the inner bypass wall structure and the outer radial boundary structure.

5. The gas turbine engine of claim 1, wherein the bleed air structure includes an actuator for opening and closing the bleed air structure.

6. The gas turbine engine of claim 1, wherein the second air flow is bled from the high pressure compressor section.

7. The gas turbine engine of claim 1, wherein the annular manifold is disposed in the annular compartment and is attached to a forward side surface of the firewall.

8. The gas turbine engine of claim 1, wherein the annular manifold is disposed outside of the annular compartment, and is attached to an aft side surface of the firewall.

9. The gas turbine engine of claim 6, wherein the air distribution system includes a flow valve that is disposable in a closed state or in an open state.

10. The gas turbine engine of claim 9, wherein the anti-icing system utilizes a temperature sensor and a controller, wherein the temperature sensor is configured to sense temperature within the annular compartment and produce a sensor signal representative of the sensed temperature, and wherein the controller is in communication with the flow valve, the temperature sensor, and a non-transitory memory storing instructions, which instructions when executed cause the controller to dispose the flow valve in the closed state or in the open state based at least in part on the sensor signal.

11. The gas turbine engine of claim 10, wherein the instructions that when executed cause the controller to dispose the flow valve in the closed state or in the open state are further based at least in part on a signal from an engine controller.

12. The gas turbine engine of claim 1, wherein the anti-icing system includes a heating system that includes a plurality of heating elements that are disposed within the annular compartment and are configured to produce thermal energy.

13. The gas turbine engine of claim 12, wherein the plurality of heating elements are electrically powered.

14. The gas turbine engine of claim 13, wherein the anti-icing system utilizes a temperature sensor and a controller, wherein the temperature sensor is configured to sense temperature within the annular compartment and produce a sensor signal representative of the sensed temperature, and wherein the controller is in communication with the plurality of heating elements, the temperature sensor, and a non-transitory memory storing instructions, which instructions when executed cause the system-controller to control the plurality of heating elements based at least in part on the sensor signal.

15. A gas turbine engine, comprising:
a fan section;

a compressor section having a low pressure compressor section and a high pressure compressor section;
a combustion section;
a turbine section;
an annular fan bypass air path defined by an outer bypass wall structure and an inner bypass wall structure;
wherein a core gas path extends through the compressor section, the combustion section, and the turbine section, and wherein an outer radial boundary structure defines an outer radial boundary of the core gas path within the low pressure compressor section;
a bleed air structure that is disposable in an open state or in a closed state;
an annular compartment defined by the inner bypass wall structure, the outer radial boundary structure, and a firewall, wherein the firewall is disposed downstream of the bleed air structure;
wherein in the open state, the bleed air structure is configured to selectively pass a first air flow from the compressor section into the annular compartment; and
an anti-icing system disposable in an activated state or in a deactivated state, wherein in the activated state the anti-icing system is configured to mitigate ice accumulation within the annular compartment;
wherein the anti-icing system includes a heating system that includes a plurality of heating elements that are disposed within the annular compartment and are configured to produce thermal energy;
wherein the plurality of heating elements are electrically powered;
wherein the anti-icing system utilizes a temperature sensor and a controller, wherein the temperature sensor is configured to sense temperature within the annular compartment and produce a sensor signal representative of the sensed temperature, and wherein the controller is in communication with the plurality of heating elements, the temperature sensor, and a non-transitory memory storing instructions, which instructions when executed cause the controller to control the plurality of heating elements based at least in part on the sensor signal;
wherein the first air flow from the compressor section that is passed into the annular compartment is at a first pressure and a first temperature;
wherein the anti-icing system includes an air distribution system configured to receive a second air flow and deliver the second air flow into the annular compartment, wherein the second air flow is at a second pressure and a second temperature; and
wherein the second pressure is greater than the first pressure, and the second temperature is greater than the first temperature.

* * * * *